United States Patent [19]
Jones

[11] Patent Number: 5,848,930
[45] Date of Patent: Dec. 15, 1998

[54] AIRCRAFT TRIMMING DEVICE

[75] Inventor: Darrell D. Jones, Mill Creek, Wash.

[73] Assignee: The Boeing Company, Seattle, Wash.

[21] Appl. No.: 527,758

[22] Filed: Sep. 13, 1995

[51] Int. Cl.⁶ ............... B24B 41/02; B23D 45/02
[52] U.S. Cl. ............. 451/237; 451/358; 451/439;
83/483; 83/489; 83/565; 83/574; 384/12;
409/138
[58] Field of Search ............... 83/68, 481, 483,
83/485, 487, 489, 508.1, 565, 574; 30/379;
144/144.52; 384/12; 408/3, 88; 409/178,
179, 138; 451/259, 281, 295, 359, 360,
358, 439, 237

[56] References Cited

U.S. PATENT DOCUMENTS

| Re. 26,393 | 5/1968 | Daugherty | 409/88 X |
|---|---|---|---|
| 3,010,352 | 11/1961 | Dunlap | 83/483 |
| 3,171,327 | 3/1965 | Williamson | 408/3 X |
| 3,354,760 | 11/1967 | Barragan | 408/3 X |
| 4,161,974 | 7/1979 | Patterson | 83/483 X |
| 4,306,598 | 12/1981 | Peot | 409/179 X |
| 4,567,927 | 2/1986 | Plamann | 409/179 X |
| 4,569,562 | 2/1986 | Sato et al. | 384/12 |
| 4,627,362 | 12/1986 | Ise et al. | 384/12 X |
| 4,830,555 | 5/1989 | Conachen | 409/178 |
| 4,947,910 | 8/1990 | Reneau | 83/574 X |
| 5,044,844 | 9/1991 | Backhouse | 409/178 |

FOREIGN PATENT DOCUMENTS

| 1413076 | 2/1964 | France | 83/483 |
|---|---|---|---|

*Primary Examiner*—Clark F. Dexter
*Attorney, Agent, or Firm*—Christensen O'Connor Johnson & Kindness PLLC

[57] ABSTRACT

Provided is an aircraft trimming device including a guide assembly (24) and a cutting tool (26). The guide assembly (24) includes a rigid plate (25) and a T-shaped track (30) mounted to one side of the plate to serve as a support and a guide for the cutting tool (26). The cutting tool (26) includes a base assembly (32); an air supply assembly (34) that is supported on the base assembly (32); and a cutting assembly (36) in pneumatic communication with the air supply assembly (34). During operation, the cutting tool (26) is pneumatically lifted by the air supply assembly (34) a slight distance off the track (30) in order that a mechanic may translate the cutting tool (26) along the track (30), thereby trimming an aircraft sub-assembly edge along a predetermined path (40).

10 Claims, 15 Drawing Sheets

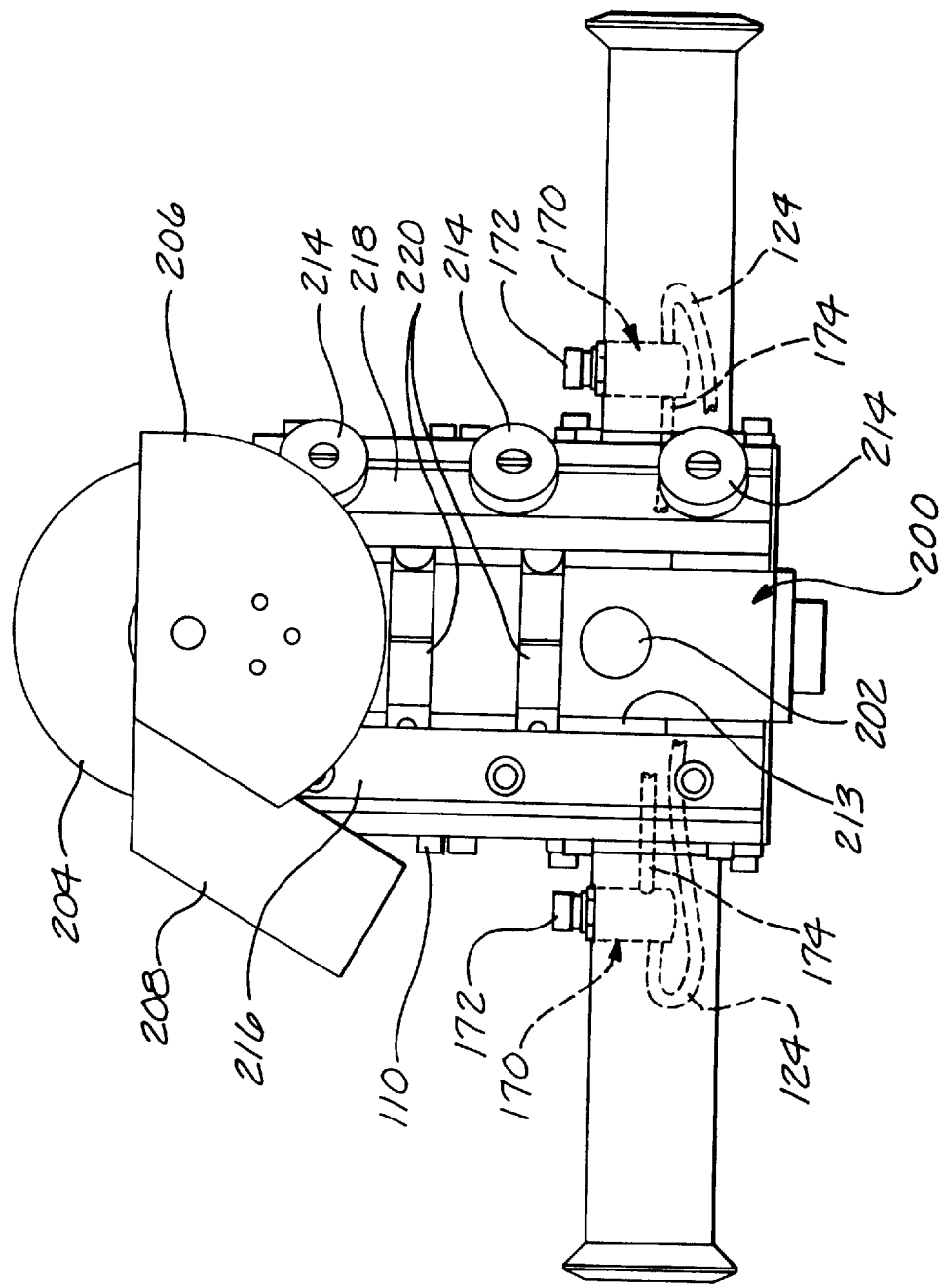

AIRCRAFT TRIMMING DEVICE

FIELD OF THE INVENTION

The present invention relates to cutting apparatus, and more particularly, to a pneumatic track-guided hand tool for use in trimming an aircraft sub-assembly edge to a predetermined shape.

BACKGROUND OF THE INVENTION

Aircraft are generally produced by first building large structural sub-assemblies, then joining the sub-assemblies to form the overall airplane structure. As frequently happens, the mating and joining of these sub-assemblies is hindered by component edges that are not perfectly matched. for example, a skin layer may be longer or shorter than specified in the drawings. To form a proper butt joint in mating one sub-assembly with an adjacent sub-assembly, it is therefore necessary to trim the edges of one or both in order to smooth their contour and conform their mating edges.

Currently, trimming an edge involves scribing the mis-shaped component, removing it from the sub-assembly, cutting it to size, and re-installing it in the subassembly. As may be appreciated, this entails a large number of mechanics laboring over a prolonged period of time. Although it is possible to hand work an edge while it is still installed, this practice is not done because few people are capable of obtaining the precision required. In addition, some edges are curved in more than one dimension, which makes them even more difficult to cut, whether done by hand or by a conventional cutting machine.

Current trimming methods are also deficient in that generally no more than one type of material may be cut using a single type of blade. Certain components, such as wing skins, are frequently comprised of layers of both aluminum and fiberglass, each with its own optimum cutter geometry, feed rate, spindle rpm, etc. Using a single type of blade to cut both materials can cause burning of the fiberglass, breaking of the cutter blade, rapid dulling of the cutter, and generally poor cutting quality. To avoid these problems, it is known to separate the layers of the component in order to cut each material separately. The overall result is that current trimming of sub-assembly edges is labor intensive, time consuming work.

Thus, a need exists for an improved method and apparatus for cutting large aircraft sub-assembly edges. The device must be capable of quickly cutting a component per the required dimension without production mechanics having to detach the component from the sub-assembly. The device should also be easily manipulated for cutting multi-material components. For safety, the device should be lightweight, easy to manipulate, easy to adjust, and responsive to only direct input from the user.

SUMMARY OF THE INVENTION

In accordance with the present invention, an aircraft trimming device having a guide assembly and a cutting tool is provided. The guide assembly includes a rigid plate and a T-shaped track mounted on one side of the plate to serve as a support and a guide for the cutting tool. The cutting tool includes a base assembly; an air supply assembly supported on the base assembly; and a cutting assembly in pneumatic communication with the air supply assembly. During operation, the cutting tool is pneumatically pushed by the air supply assembly a slight distance above the track in order that a mechanic may translate the cutting tool along the track, thereby trimming a sub-assembly edge along a pre-determined path.

In accordance with further aspects of this invention, the base assembly functions to support the cutting assembly and the air supply assembly; to guide and translate the cutting tool along the track; and to hold the cutting tool at any given location along the track at the command of the user. The base assembly includes a base plate; an air supply support plate; an air bearing that lies adjacent the T-shaped track during operation of the device; translational movement components; and clamping components.

In accordance with still further aspects of this invention, the air supply assembly functions to appropriately regulate the pressure of the air power available to the various cutting tool pneumatic components. The air supply assembly includes a housing; two cylindrical handles; and multiple air regulating components in pneumatic communication via various air passages. In general, the regulating components and air passages are located inside the housing, while the handles are attached to the outside of the housing.

In accordance with other aspects of this invention, when positive air pressure is supplied to the air bearing by the air supply assembly, the air bearing is caused to move a slight distance above the T-shaped track. The mechanic may then easily move the "floating" cutting tool along the track. When negative air pressure is supplied to the air bearing, a suction is created between the air bearing and the track. The suction is strong enough to allow the cutting tool to be securely held at any location along the track, regardless of cutting tool's orientation or weight.

In accordance with still other aspects of this invention, the cutting assembly includes at least one bracket for mounting a conventional pneumatic work tool to the housing of the air supply assembly; first and second side rails; and multiple wedge lock knobs. The work tool preferably has an on/off switch and an exhaust deflector for dissipating excess pressurized air.

In accordance with yet further aspects of this invention, operation of the aircraft trimming tool of the present invention includes the steps of securing the pneumatic work tool to the cutting assembly; sliding the cutting tool on the T-shaped track; attaching a pressurized air supply to the cutting tool; properly positioning the cutting tool and track relative to a workpiece; energizing the various components; and then trimming the sub-assembly edge by translating the right-angled cutting tool along the track.

As may be appreciated from the foregoing, the aircraft trimming tool of the present invention provides an efficient means of cutting an aircraft sub-assembly edge to a predetermined shape without having to remove any portion of the sub-assembly in order to make the cut. Also, by having a guide assembly formed to the exact shape as the cut required, great precision can obtained, thus reducing the variation of cut shape between like components. It is possible to compensate for the variation in materials to be cut by simply adjusting the depth and orientation of the blade. The present invention permits the mechanic to change the blade and re-position the cutting tool to trim the next layer.

In addition, the aircraft trimming tool of the present invention is easily manipulated and includes a number of safety features that reduce the potential of injury during its use.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 14 is a plan view of portions of the cutting tool of FIG. 2;

DETAILED DESCRIPTION OF THE PREFERRED EMBODIMENT

In describing the construction of the apparatus of the invention and the operation thereof, reference is made to the particular applications of cutting or trimming of aircraft wing skins. However, it should be understood that the application of the apparatus of the invention is not intended to be limited to this particular environment, nor to the particular function of cutting. It is conceivable that the apparatus be utilized to work (e.g., sand, rout, drill, staple, rivet, cutoff, etc.) various types of airplane structures (e.g., door openings, window openings, etc.) in the same manner it is utilized to trim a wing edge. Therefore, although the present invention was developed for, and is described in connection with aircraft wing edges, it is to be understood that the invention may also find use in other precision aircraft work applications. As a side note, not all components are shown in each view. Some have been omitted in order to better display underlying components.

Figure 1:
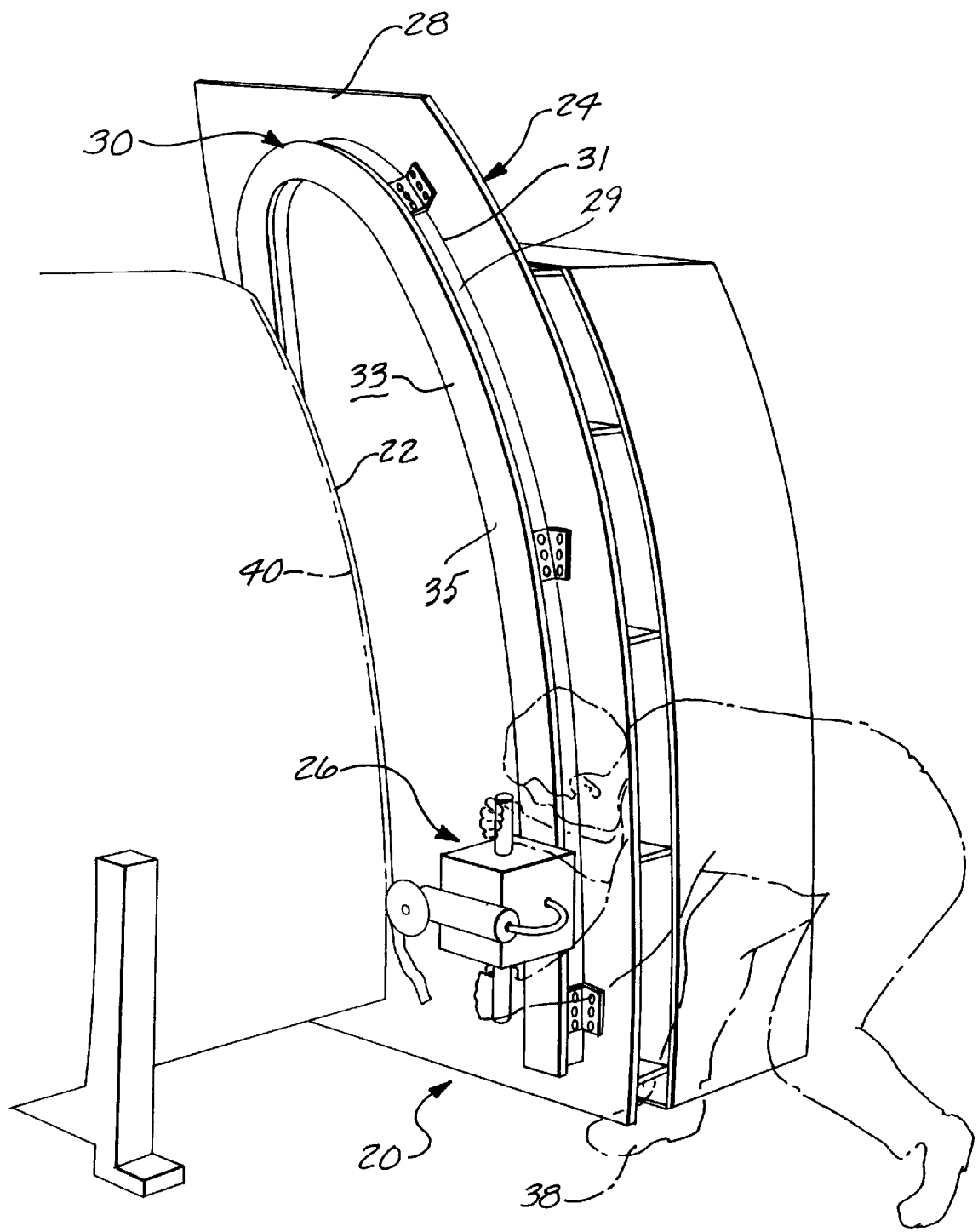
FIG. 1 is a perspective view of an aircraft trim tool formed in accordance with the present invention, showing application to a wing edge.

FIG. 1 is a schematic perspective view of an aircraft trimming device 20 formed in accordance with the present invention, showing application to an inboard wing edge 22. The wing edge 22 is typically stored in a vertical orientation so as to avoid unnecessary loading and potential deformation. The trimming device 20 includes a guide assembly 24 and a cutting tool 26. The cutting tool 26 has been highly simplified in FIG. 1 for ease of drawing.

The guide assembly 24 includes a rigid plate 28 having a T-shaped (in cross-section) track 30 mounted on one side to serve as a support and a guide for the cutting tool 26. The T-shaped track 30 includes a lower edge 31 and an upper support surface 33. The vertical portion 29 of the "T" shape has a generally square cross-sectional shape. The cross member 35 of the "T" shape has a generally rectangular cross-sectional shape. The T-shaped track may be integrally formed, or may be built-up from separate components. As a side note, the term "horizontal" is defined herein to refer to the X or Y direction according to the coordinate system of FIGS. 2 and 4, "vertical" being in the Z direction.

The T-shaped track 30 is attached to the plate 28 to form a path along which the cutting tool may be guided. This path may be as simple or as complex in contour as required by the object being trimmed. By judicious placement of the roller components discussed below, the cutting tool of the present invention is capable of negotiating all but the tightest of curves. The lower edge 31 may be mounted to the plate 28 using conventional methods, such as the L brackets shown in FIG. 1.

The track upper surface 33 is very smooth so that the cutting tool 26 may pneumatically glide along the track above the upper surface a distance of approximately 0.002 inches. The optimal material for the upper surface is steel, although any suitably rigid material that is capable of being smoothed approximately 63 RMS, or less, will suffice.

As shown in FIG. 1, the orientation of the cutting tool 26 and the track 30 to the wing is such that the track upper surface 33 lies in a plane generally transverse to the surface of the wing. The track follows a curve that is larger than, though proportionally equivalent to, the shape of the intended wing edge to be cut. The cutting tool is oriented on the track such that a work tool 200 attached to the cutting tool is substantially normal to the outer wing surface as the cutting tool moves around the track. For work tools using blades, the blade axis of rotation is generally parallel to the outer wing surface and normal to the upper surface of the track.

Variations of the above orientations are possible. The work tool 200 of the cutting tool 26 may be oriented in whatever manner is appropriate for the work being done. For instance, the track may follow a curve that is the same size as the intended edge to be cut. Such a variation would be useful for cutting a door hole in a fuselage with a small diameter router; or, for cutting edges that have no curves. The track may also follow a curve that is proportionally smaller than the intended edge cut. This would be most useful for large edges having only large diameter curves, such as encountered when joining large fuselage cross-section sub-assemblies.

Figure 2:
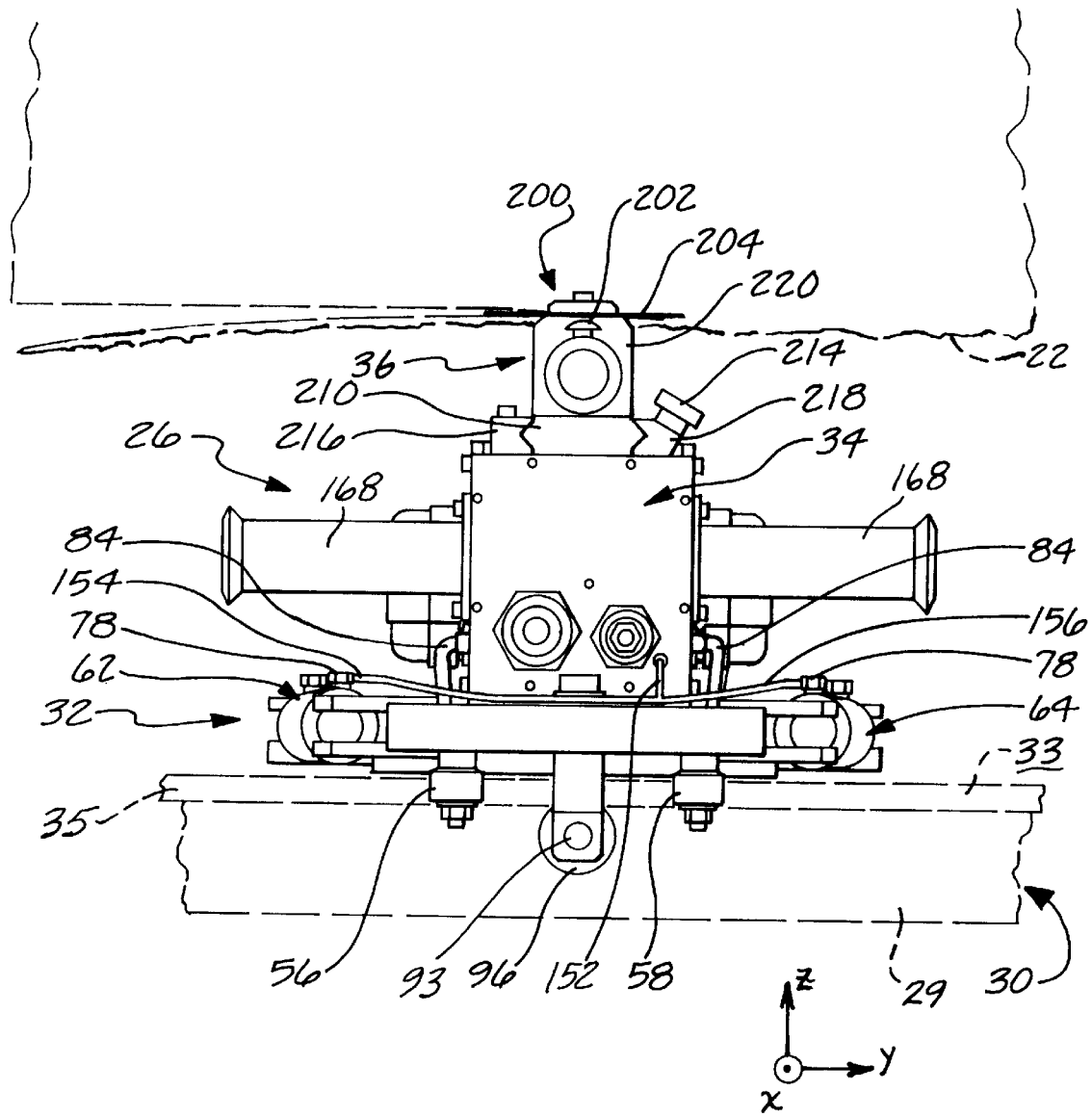
FIG. 2 is a rear view of a cutting tool formed in accordance with the present invention, with a portion of an aircraft wing edge and a portion of a guide assembly formed in accordance with the present invention both shown in phantom.
Figure 3:
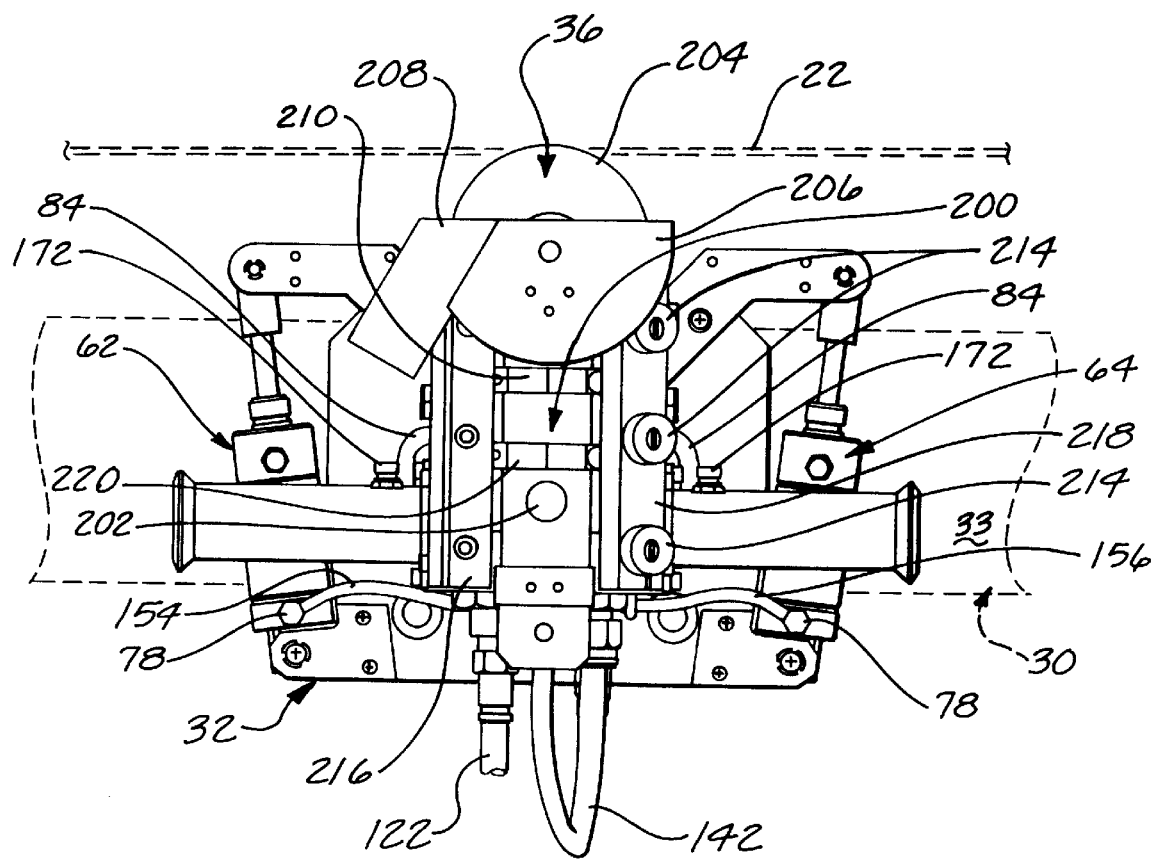
FIG. 3 is a plan view of the cutting tool of FIG. 2.
Figure 4:
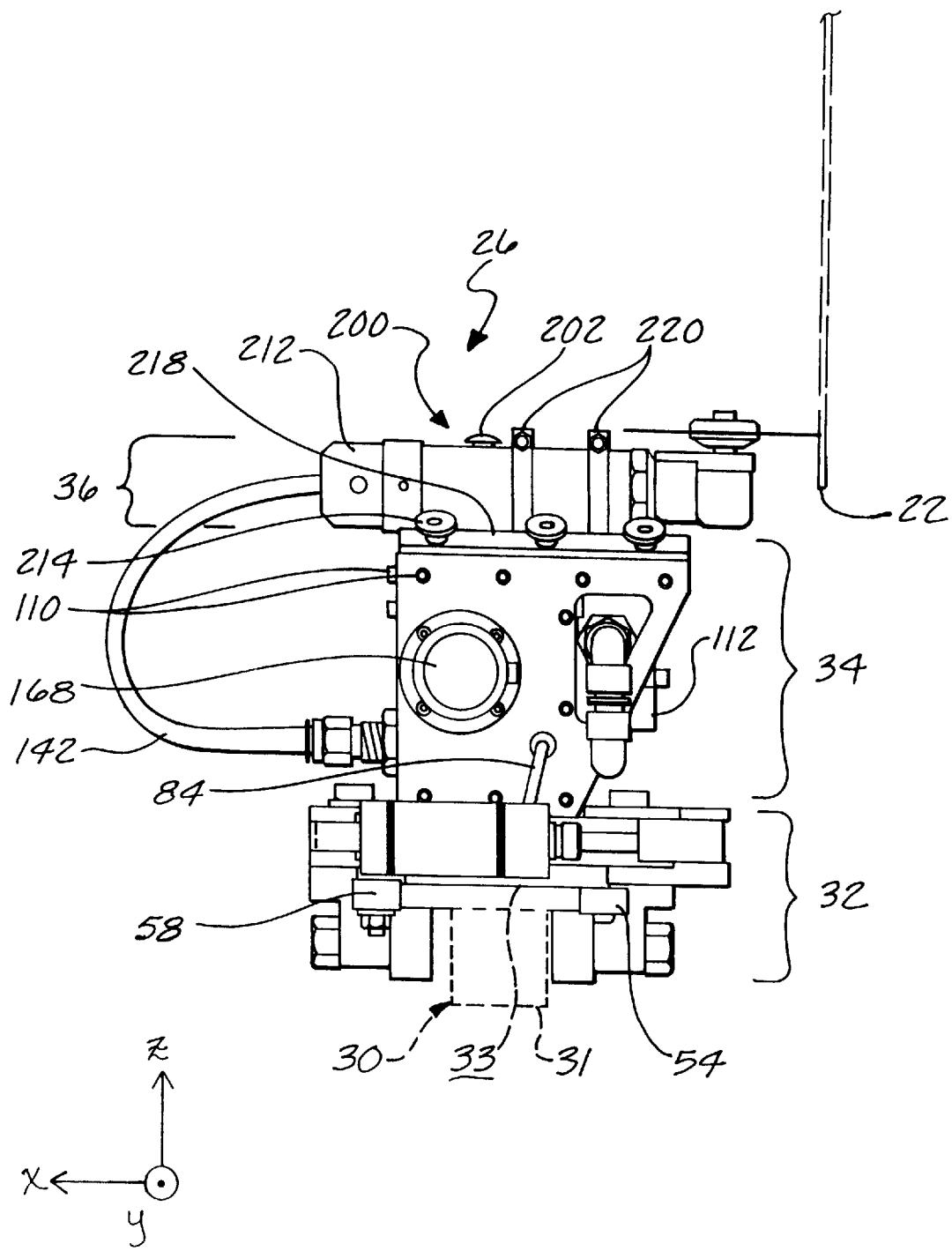
FIG. 4 is a side view of the cutting tool of FIG. 2.

Referring to FIGS. 2–4, the cutting tool 26 includes a base assembly 32; an air supply system 34 that is supported on the base assembly 32; and a cutting assembly 36 in pneumatic communication with the air supply assembly 34. The cutting tool 26 is translated along the track 30 by a mechanic 38 to cause the cutting assembly 36 to trim the wing edge 22 along a predetermined path 40.

Figure 5:
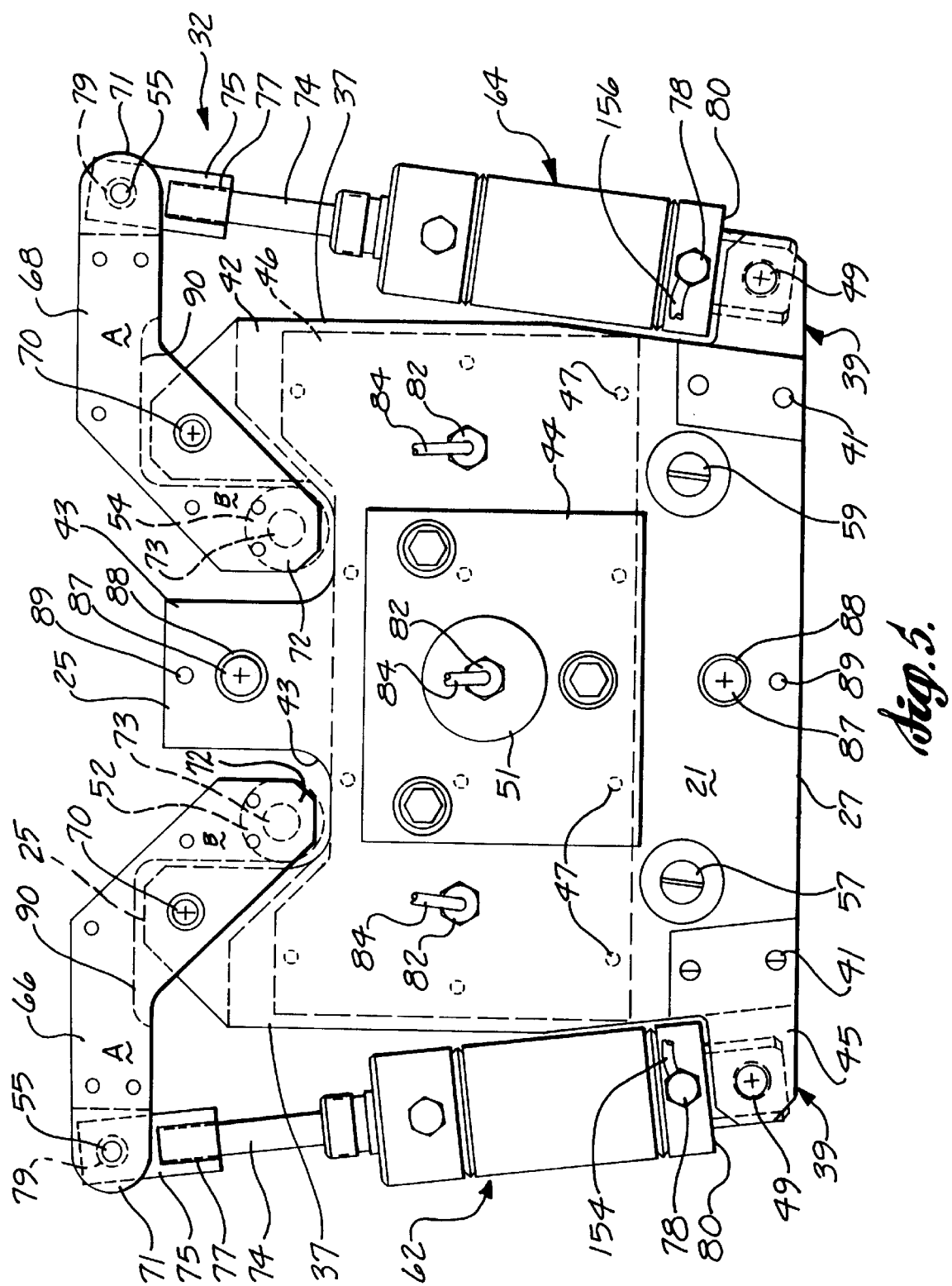
FIG. 5 is a plan view of a base assembly formed in accordance with the present invention of the cutting tool of FIG. 2.

Referring to FIG. 5, the base assembly 32 functions to support the cutting assembly 36 and the air supply assembly 34; to guide and translate the cutting tool 26 along the track 30; and to hold the cutting tool 26 at any given location along the track 30 at the command of the user. The main components of the base assembly 32 are a base plate 42; an air supply support plate 44; an air bearing 46; translational movement components; and clamping components.

The base plate 42 is a generally thick rectangular plate having an upper surface 21, a lower surface 23, a front edge 25, a rear edge 27, and two side edges 37. Two clevis joints 39 are attached to the side edges 37 near the rear edge 27. The clevis joints 39 are oriented with first and second tines 45 parallel to the base plate upper and lower surfaces 21, 23, the tines 45 extending horizontally out from the side edges 37. The pins 49 of the clevis joints are oriented substantially normal to the base plate upper and lower surfaces 21, 23. The clevis joints 39 may be integrally formed with the base plate 42, or may be attached to the base plate using conventional fastening methods, for example small screws 41. The base plate 42 also includes two rectangular slots 43 cut from the front edge 25 rearwardly into the base plate, through the base plate's entire thickness. The clevis joints 39 and the slots 43 are both important to the clamping components and are discussed below in connection therewith.

The base plate 42 has three air bearing pressure ports 82 that extend from the plate's lower surface 23 to its upper surface 21. The pressure ports 82 function to allow pressurized air to pass through the base plate 42 and reach the air bearing 46. The size and number of these ports will vary according to factors known to those skilled in the art of pneumatic power design.

The air supply support plate 44 is a rectangular plate dimensioned significantly smaller than the base plate 42. The air supply support plate 44 may include a hole 51 bored therethrough to allow passage of pneumatic tubing to the base plate 42 and eventually to the air bearing 46. Depending on the precise configuration adopted, multiple holes may be necessary, or alternatively, no holes may be needed. The air supply support plate 44 is optimally attached to the middle region of the base plate upper surface 21 to focus the weight of the various components on the base plate. The plate 44 may be mounted using conventional methods such as the threaded bolts shown in FIG. 5.

Figure 6:
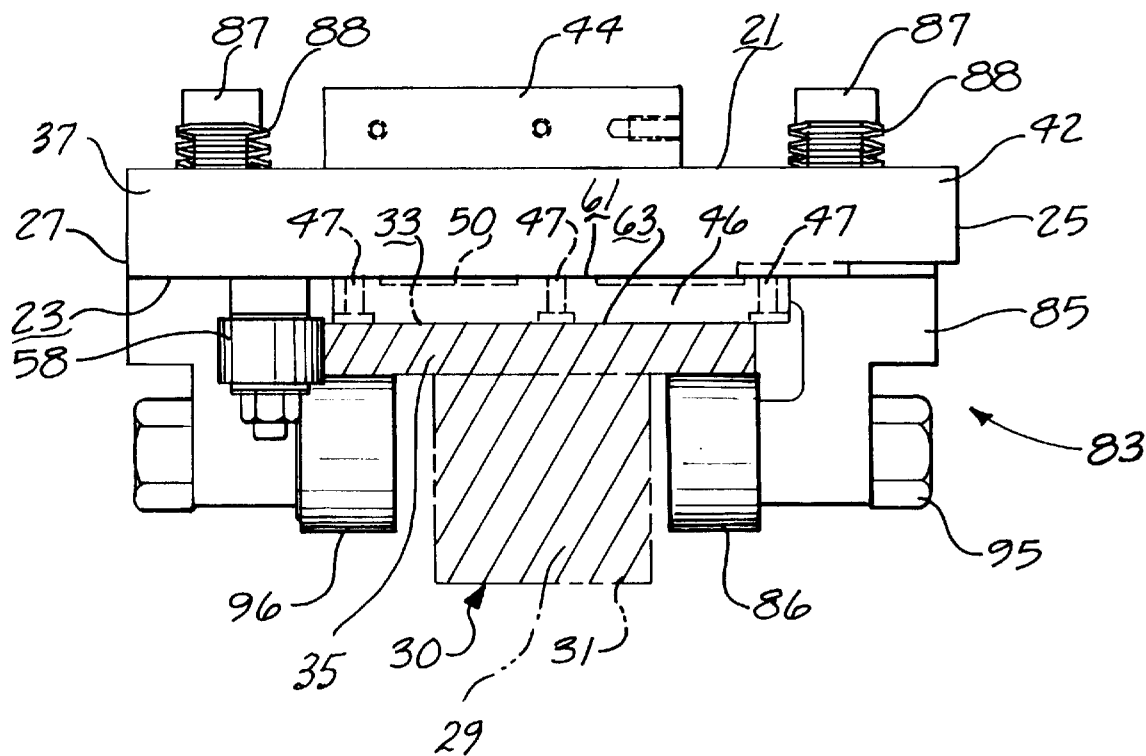
FIG. 6 is a side view of portions of the base assembly of FIG. 5.
Figure 8:
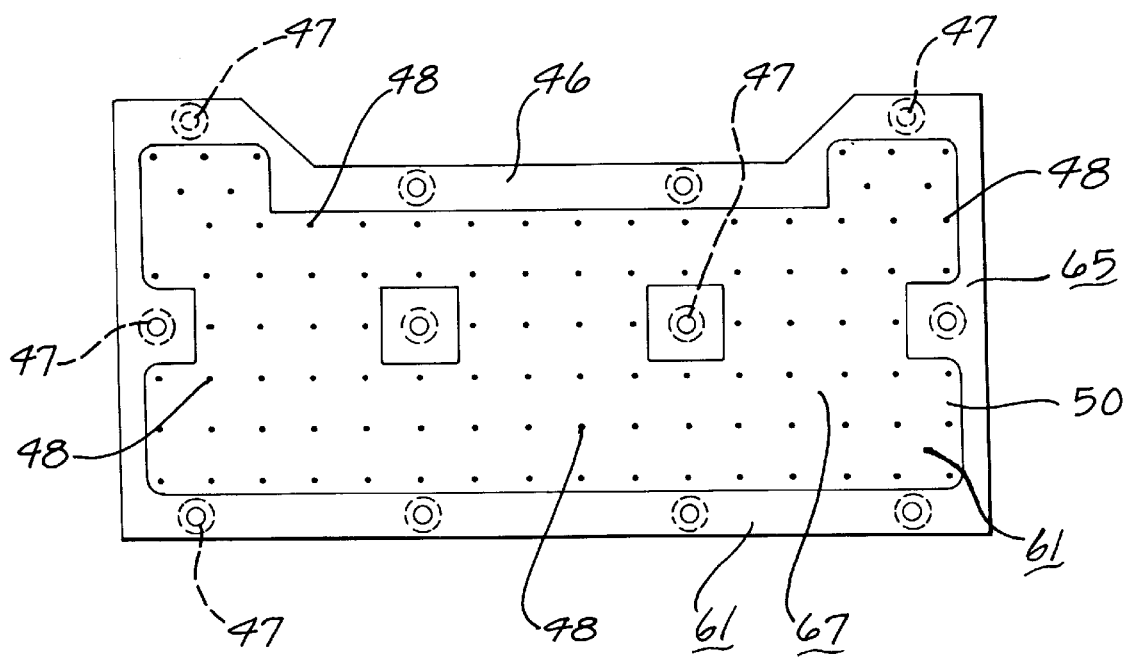
FIG. 8 is a plan view of an air bearing for the base assembly of FIG. 5.
Figure 9:
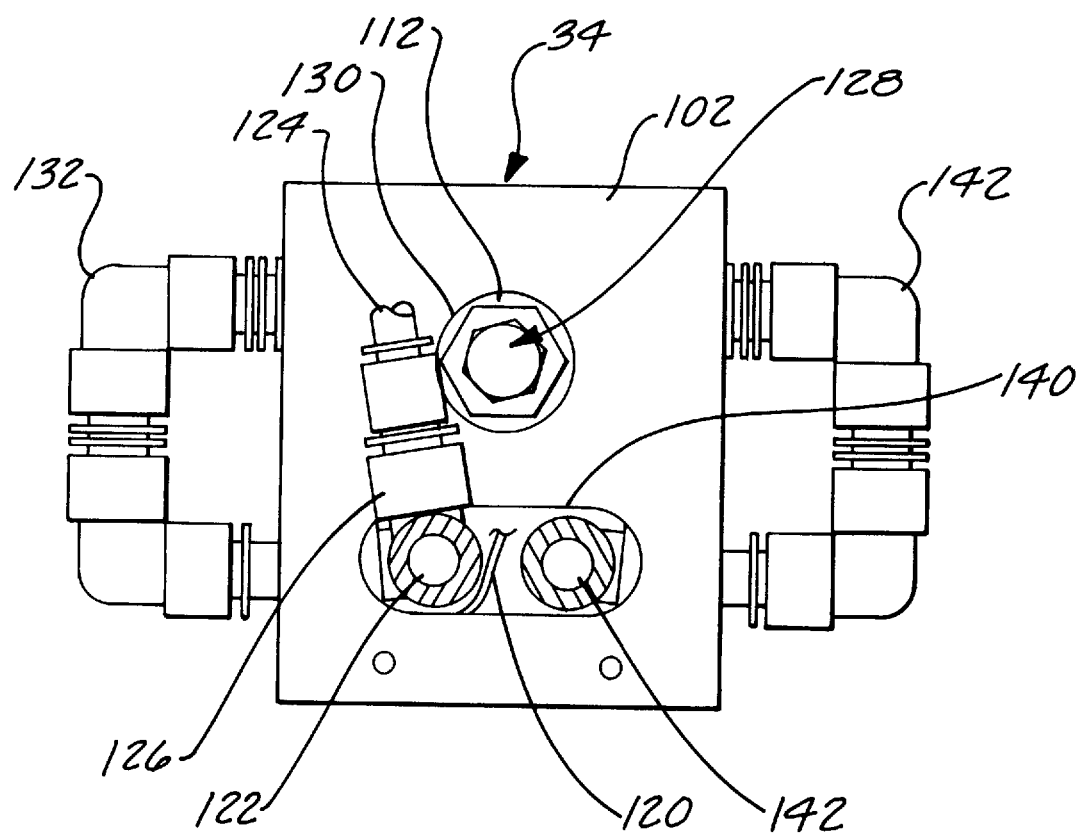
FIG. 9 is a rear view of an air supply assembly for the cutting tool of FIG. 2.

Referring to FIGS. 5, 6, and 8, the air bearing 46 is a generally rectangular plate dimensioned smaller than the base plate 42. The longer sides of the air bearing are roughly parallel with the base plate front and rear edges 25, 27. The shorter sides of the air bearing 46 are roughly the same size as the width of the cross member of the track 30. The air bearing 46 is attached to the base plate lower surface 23 using conventional fastening methods such as threaded screws. Holes 47 for conventional attachment screws are shown spaced peripherally around the air bearing 46. The air bearing 46 includes an upper surface 61 and a lower surface 63. The upper surface 61 has two elevations. A first elevation 65 exists around the periphery of the upper surface 61, and a second, lower elevation 67 exists in the middle region of the upper surface 61. The variation in elevations may be attained by boring a shallow pocket 50 in the middle region of the upper surface 61, or conversely, by building up the outer edges of the upper surface 61 to form the pocket 50.

The air bearing 46 additionally includes a plurality of small holes 48 bored through the entire transverse thickness of the bearing 46, all holes being within the region of the lower elevation 67. All air bearing pressure ports 82 must be formed in the base plate 42 at locations directly above the air bearing upper surface lower elevation 76. As will be readily appreciated, air pressure passing through the base plate 42 via the air bearing pressure ports 82 will pass into the pocket 50 and exit through the plurality of holes 48. It is important that the higher elevation 65 of the air bearing upper surface and the base plate lower surface 23 are in sealing communication with one another. This will allow the air entering from the air bearing pressure ports 82 to exit the air bearing 46 only through the plurality of small holes 48.

When high pressure air is supplied to the air bearing 46 via the air bearing pressure ports 82, the air bearing expels the high pressure air through the plurality of small holes 48. The expelled air pushes against the track upper surface 33, urging the cutting tool 26 up and off the upper surface. Roughly 60 psi of air pressure is required to lift the cutting tool approximately 0.002 inches from the upper surface 33 in the configuration shown. These values, though, will vary dramatically depending on the configuration of the bearing, the type of application, the cutting tool materials used, the contours of the track, etc. When air is evacuated from the air bearing 46, the plurality of small holes 48 act as suction holes. A sufficiently negative air pressure can create a strong attraction between the air bearing lower surface 63 and the T-shaped track 30, and hence clamp the cutting tool 26 to the T-shaped track 30.

Referring to FIGS. 2 through 7, when the air bearing is in operation, the cutting tool is held on the track by translational movement components, which are generally a number of rollers located on the underside of the base plate 42. Specifically, there are first and second cam rollers 52, 54; first and second cam yoke rollers 56, 58; and first and second guide rollers 86, 96. The rollers are located on the underside of the base plate 42 and are in rotatable communication with the bottom and edge surfaces of the horizontal member of the T-shaped track 30. All rollers are preferably comprised of steel.

The cam and cam yoke rollers 52, 54, 56, 58 function to guide the cutting tool 26 longitudinally along the length of the T-shaped track 30. The guide rollers 86, 96 function to keep the cutting tool vertically attached to the track 30 when the air bearing is in operation. The guide rollers are especially important if the contour of the track 30 includes portions that are upside down. This allows the track to be designed to any shape in virtually any orientation, thus making it easier to trim sub-assemblies that are difficult to move or that have awkward orientations.

The first and second cam rollers 52, 54 are located on the underside of the base plate 42 near the plate's front edge 25. They are shown best in FIGS. 4 and 5. The cam rollers have been omitted from FIG. 6 in order to provide a better view of the guide rollers 86, 96. The axes of rotation of the cam rollers 52, 54 are positioned generally normal to the plane of the base plate 42. The cam rollers 52, 54 pivot about pins 73 attached to first and second rocker arms 66, 68 that are a part of the clamping components discussed below. The pins 73 extend vertically from the rocker arms 66, 68 one within each of the slots 43 of the base plate front edge 25. Therefore, the cam rollers 52, 54 lie directly beneath the slots 43.

The first and second cam yoke rollers 56, 58 are located on the underside of the base plate 42 near the plate's rear edge 27. The axes of rotation of the first and second cam yoke rollers are also positioned generally normal to the plane of the base plate 42 using bolts 57, 59 or the like (see FIG. 5). The yoke rollers 56, 58 are rotatably attached directly to the base plate 42. The rotatable attachments of the rollers to the base may be any of a number of known methods. Shown as preferred in FIG. 6 are shafts and bushings held by washers and elastic locknuts.

In operation, the cross member of the T-shaped track 30 lies between the pair of cam rollers 52, 54 and the pair of cam yoke rollers 56, 58, so that the rollers respectively engage opposite edges of the cross member. The track upper surface 33 is directly adjacent the air bearing lower surface. Therefore, the distance between the pair of cam rollers 52, 54 and the pair of yoke cam rollers 56, 58 will depend on the width of the track cross member. It is important that the rollers are positioned such that in their normal operating mode, enough pressure exists between the pairs to keep the cutting tool 26 clamped to the track, but not so much pressure that an average mechanic cannot overcome the cam-to-track friction in order to translate the cutting tool 26 along the track 30. This arrangement of rollers allows the cutting tool to be translated along the track in either direction.

The distance between roller pairs may vary depending on the size of the radii of the curves required for a particular application. For example, applications having small radii curves will necessitate close positioning of the cam rollers and close positioning of the cam yoke rollers, in order to negotiate the tight curves. The curves shown in FIG. 1 all turn to the left when the cutting tool translates along the track in a counter-clockwise direction. Therefore, the rollers on the inside of the track curve are positioned more closely to each other than the rollers on the outside of the curve to each other.

The first and second guide rollers 86, 96 are located on the underside of the base plate 42, one near the middle of the plate's front edge 25 and one near the middle of the plate's rear edge 27. The guide rollers 86, 96 are shown best in FIGS. 5 and 6. The axes of rotation of the guide rollers 86, 96 are positioned generally parallel to the plane of the base plate 42 and parallel to the plate's side edges 37.

Figure 7:
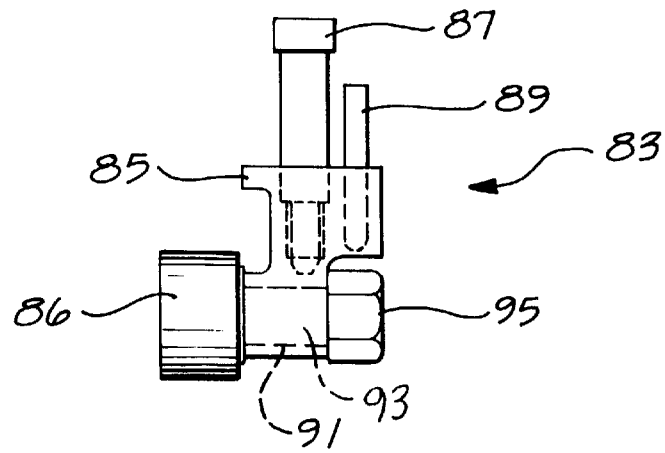
FIG. 7 is a side view of a guide roller assembly formed in accordance with the present invention of the base assembly of FIG. 5, with portions of the guide roller assembly shown in phantom.

The guide rollers 86, 96 are each attached to the base plate 42 via a guide roller assembly 83, best shown in FIGS. 6 and 7. The guide roller assembly 83 includes a housing 85 that is attached at the base plate lower surface 23 via a shoulder bolt 87. The shoulder bolt 87 passes through the base plate 42 to extend beyond the base plate upper surface 21. The shoulder bolt 87 is continually urged upward by a compression spring 88 (shown in FIGS. 5 and 6) located between the head of the shoulder bolt 87 and the base plate upper surface 21. The compression spring 88 allows the cutting tool 26 to remain close to the track 30 even when the air bearing 46 expels high pressure air onto the track upper surface 33. The compression spring 88 also pushes the cutting tool 26 toward the track 30 in the absence of positive air pressure from the air bearing 46, hence acting as a preload for braking. This aids in increasing the tool's ability to hold a location on the track, regardless of the track's orientation. The precise compressive strength of the compression spring 88 will depend on the amount of air pressure to be overcome, the weight of the cutting tool 26, the size of the components, etc.

A dowel pin 89 is inserted between the housing 85 and the base plate lower surface 23, the dowel pin 89 being parallel to the shoulder bolt 87 in order to help prevent rotation of the housing 85 about the shoulder bolt 87. The housing 85 extends downwardly and includes a shaft 91 at its lower portion. The guide roller is rotated about a bolt 93 that passes through the housing shaft 91 and is secured therein via a nut 95. Various bushings are also provided in the guide roller assembly 83 for ease of rotation.

The optimum location of the guide rollers 86, 96 relative to the base plate 42 is directly opposite one another—one near the base plate front edge 25 and one near the rear edge 27. The optimal location of the guide roller assembly 83 relative to the track 30 is such that the guide rollers 86, 96 are in rotatable communication with the exposed undersides of the cross member of the T-shaped track 30, one on each side of the track.

Referring to FIG. 5, the clamping components include first and second air cylinders 62, 64; and first and second rocker arms 66, 68 each of which includes first and second pivot points 70, 71. The clamping components cause the cam rollers 52, 54 to clamp toward the cam yoke rollers 56, 58 which helps the cutting tool 26 to hold a particular location along the length of the track 30.

The air cylinders 62, 64 may be of any known type, such as the rod-and-piston type actuators shown in FIGS. 2–5 and 17. The cylinders 62, 64 are positioned one along each side edge 37 of the base plate 42, their direction of expansion and contraction being roughly parallel to the base plate side edges 37. A distal end 80 of each cylinder is formed to fit between the clevis joint tines 45. The pin 49 of the clevis joint passes through the distal end 80 and allows the cylinder to be rotatably held by the clevis joint 39. Each air cylinder 62, 64 also includes an air pressure port 78 near its distal end 80 for providing the necessary air pressure to extend or retract the cylinder rods 74.

The first and second rocker arms 66, 68 are dog-legged shaped members, each having an A segment, a B segment, and a transverse pivot point 70 located near the intersection of the A and B segments (i.e., roughly at the bend in the dog-leg). Each arm also includes a first end 71 located at the unattached end of the A segment and a second end 72 located at the end of the unattached B segment.

In general, the rod of the first cylinder 62 is rotatably connected to the first end 71 of the first rocker arm 66. The second end 72 of the first rocker arm 66 is rotatably attached to the pivot pin 73 of the first cam roller 52, while the pivot point 70 of the first rocker arm 66 is rotatably attached to the base plate 42 near the base plate front edge 25. Likewise, the rod of the second cylinder 64 is rotatably connected to the first end 71 of the second rocker arm 68. The second end 72 of the second rocker arm 68 is rotatably attached to the pivot pin 73 of the second cam roller 54, while the pivot point 70 of the second arm 68 is rotatably attached to the base plate 42 near the base plate front edge 25.

The rod end of each cylinder is rotatably connected to the first end 71 of a rocker arm using conventional methods. The method demonstrated in FIG. 5 utilizes a small fitting 75 having a socket 77 at one end to receive the rod end, and a shaft 79 at the other end for holding a bushing and pivot pin 55 therethrough. The bushing and pivot pin 55 extend transversely through both the rocker arm first end 71 and the fitting 75.

In order that the above system work, various cutouts have been made to the base plate 42 and the rocker arms 66, 68 in order to avoid conflicting space usage. In FIG. 5, a portion 90 of each rocker arm has been removed from the region surrounding the pivot point that is closest to the base plate front edge 25. The removed portion 90 forms a pocket within which a portion of the base plate 42 defined by a side edge 37, the front edge 25 and a slot 43 edge, may be held. The corners of the base plate at the intersection of the front edge 25 and each side edge 37 are clipped off to further avoid a space conflict with the rocker arms 66, 68. Additionally, a portion of the rocker arm lower surface is removed to allow the base plate to fit easily within the removed portion 90 of the rocker arm.

In this way, the rocker arm is allowed to rotate freely about the pivot point 70 when the cylinder rod is extended and retracted. Extension of the rod causes the cam roller to apply increased pressure against the T-shaped track 30. Given a large amount of air pressure, the air cylinders 62, 64 can provide enough force against the rocker arms 66, 68 and cam rollers 52, 54 to keep the cutting tool 26 gripping the T-shaped track 30 at a particular location. When the air cylinders 62, 64 are retracted and the air bearing 46 is receiving a large positive air pressure, the cutting tool 26 will float easily along the track upper surface 33, guided by the various rollers 52, 54, 56, 58, 86, 96.

The air supply assembly 34 functions to appropriately regulate the pressure of the air available to the various cutting tool pneumatic components. The assembly 34 is shown generally in FIGS. 9–14, and includes a housing 98, two cylindrical handles 168, and multiple air regulating components in pneumatic communication via various air paths. In general, the regulating components and air paths are located inside the housing 98, while the handles 168 are attached to the outside of the housing 98.

Figure 12:
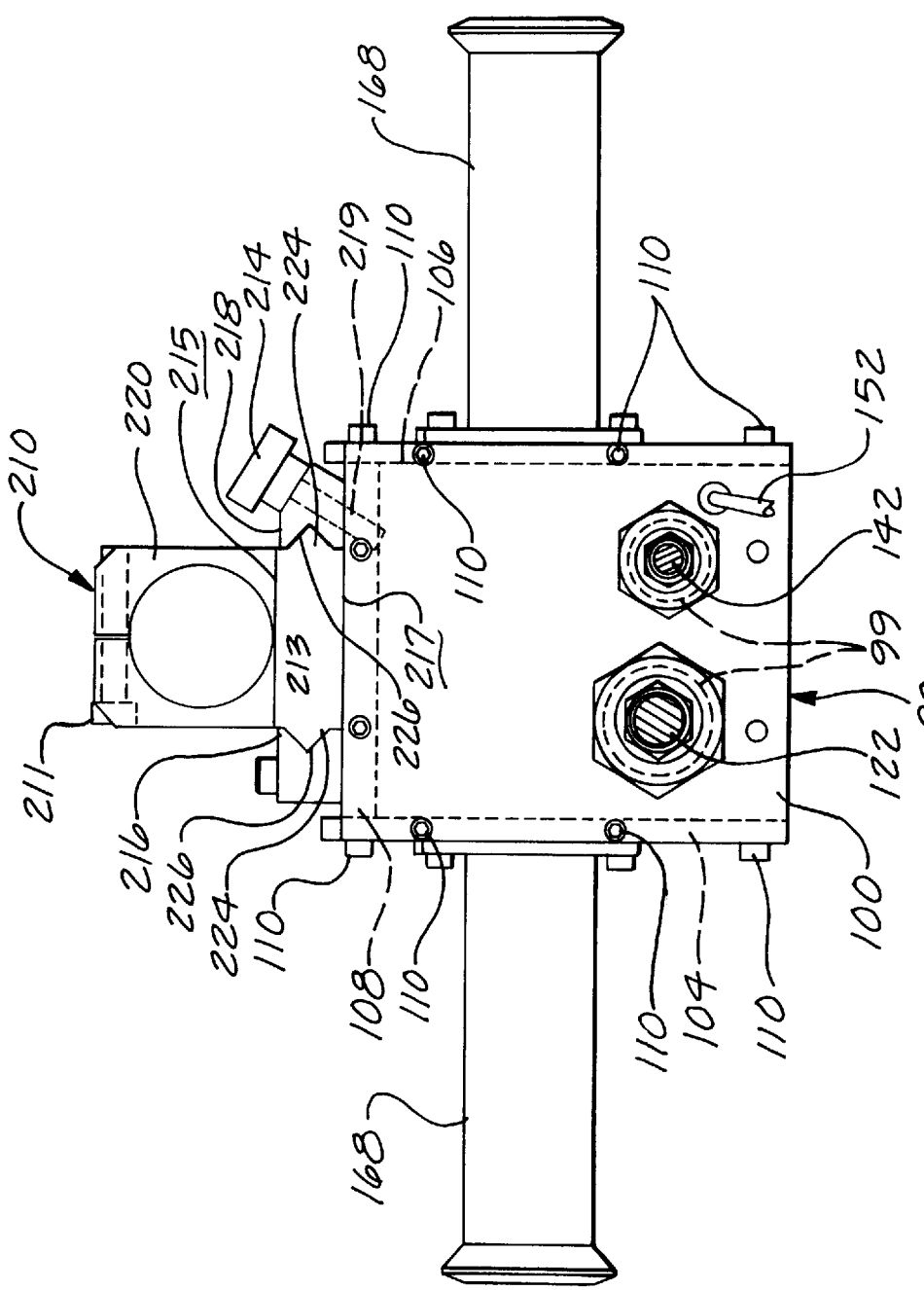
FIG. 12 is a rear view of portions of the cutting tool of FIG. 2 without the work tool.
Figure 13:
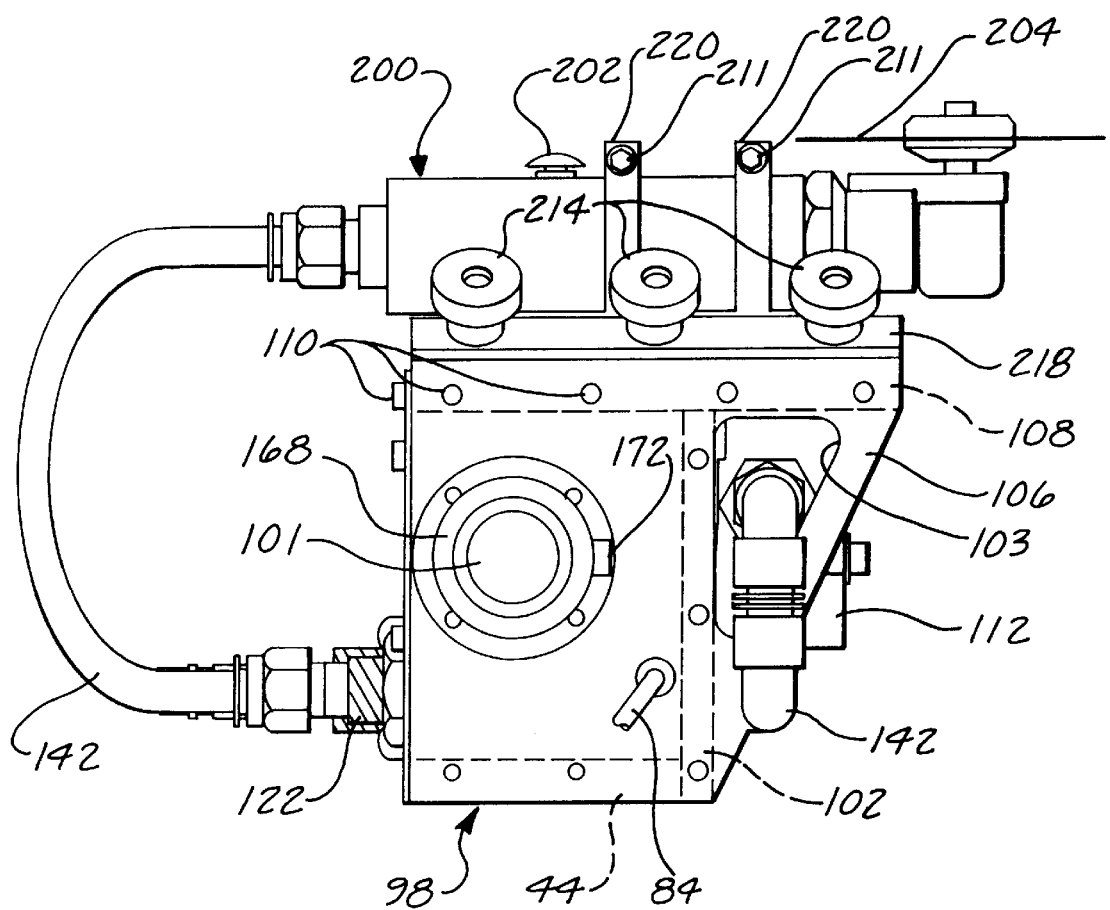
FIG. 13 is a side view of portions of the cutting tool of FIG. 2.
Figure 16:
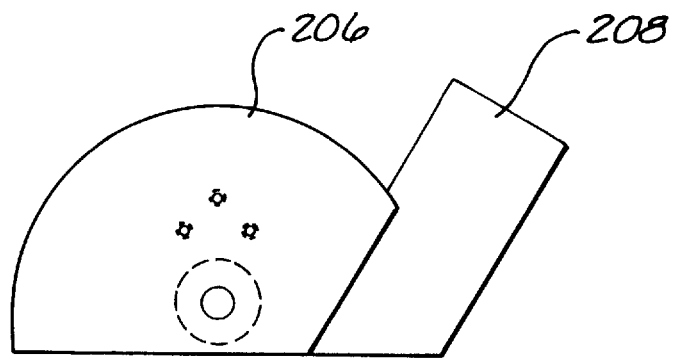
FIG. 16 is a bottom view of the blade guard of FIG. 15.
Figure 15:
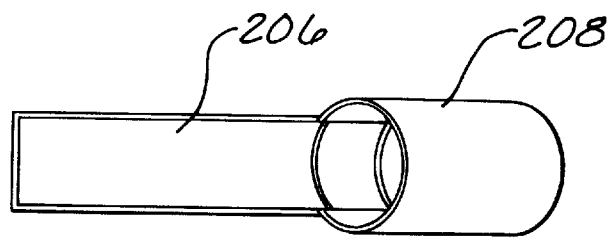
FIG. 15 is a front view of a blade guard shown in FIGS. 3 and 14.

The housing 98 is formed from a back plate 100, a front plate 102, a first side plate 104, a second side plate 106, a top plate 108, and the air supply support plate 44. As shown in FIGS. 5, 12, and 13, the plates are attached to one another via a plurality of conventional screws 110, the support plate 44 being additionally bolted to the base plate 42 as discussed above. A preferred plate material is 3/8-inch thick aluminum.

Referring to FIG. 12, the back plate 100 is a rectangular metal piece having at least two circular openings 99 formed therethrough. When assembled, the back plate 100 is oriented substantially vertically. The first side plate 104 is a metal piece of the same general height as the back plate 100, the same lower edge width as the air supply support plate 44, however, an upper edge width of generally the same length as the work tool 200. At least two openings 101, 103 are formed in each of the first and second side plates 104, 106. One of the openings 101 is located on each side plate 104, 106 such that it provides entry into the interior of the housing. The second side plate 106 is a mirror image copy of the first side plate 104. When assembled, both the first and second side plates 104, 106 are oriented substantially vertically.

The front plate 102 is a rectangular metal piece having at least two openings 130, 140 therethrough. The front plate 102 is of a similar dimension as the back plate 100. The front plate 102 is oriented substantially vertically between the two side plates 104, 106. The front plate's lower corners are adjacent the lower corners of the side plates. The top plate 108 is a rectangular metal piece dimensioned such that its edges generally meet the upper edges of the side and back plates. When the housing 98 is assembled, the top plate 108 is oriented in a substantially horizontal plane. In this way, a cube-shaped housing is defined.

The cylindrical handles 168 are attached to the side plates 104, 106, one about each of the openings 101. The attachment may be made using any known method. The preferred handles are of a size that makes it comfortable to grip by the average mechanic. Each handle 168 is formed of a hollow aluminum tube so that a passageway is available from the interior of the handle through the opening 101 of the side plate. Each handle 168 additionally includes a small handle push button 172 (shown in FIG. 14) located along the handle's outer surface, near the side plate. The button 172 is described below in connection with the air regulating components.

Figure 17:
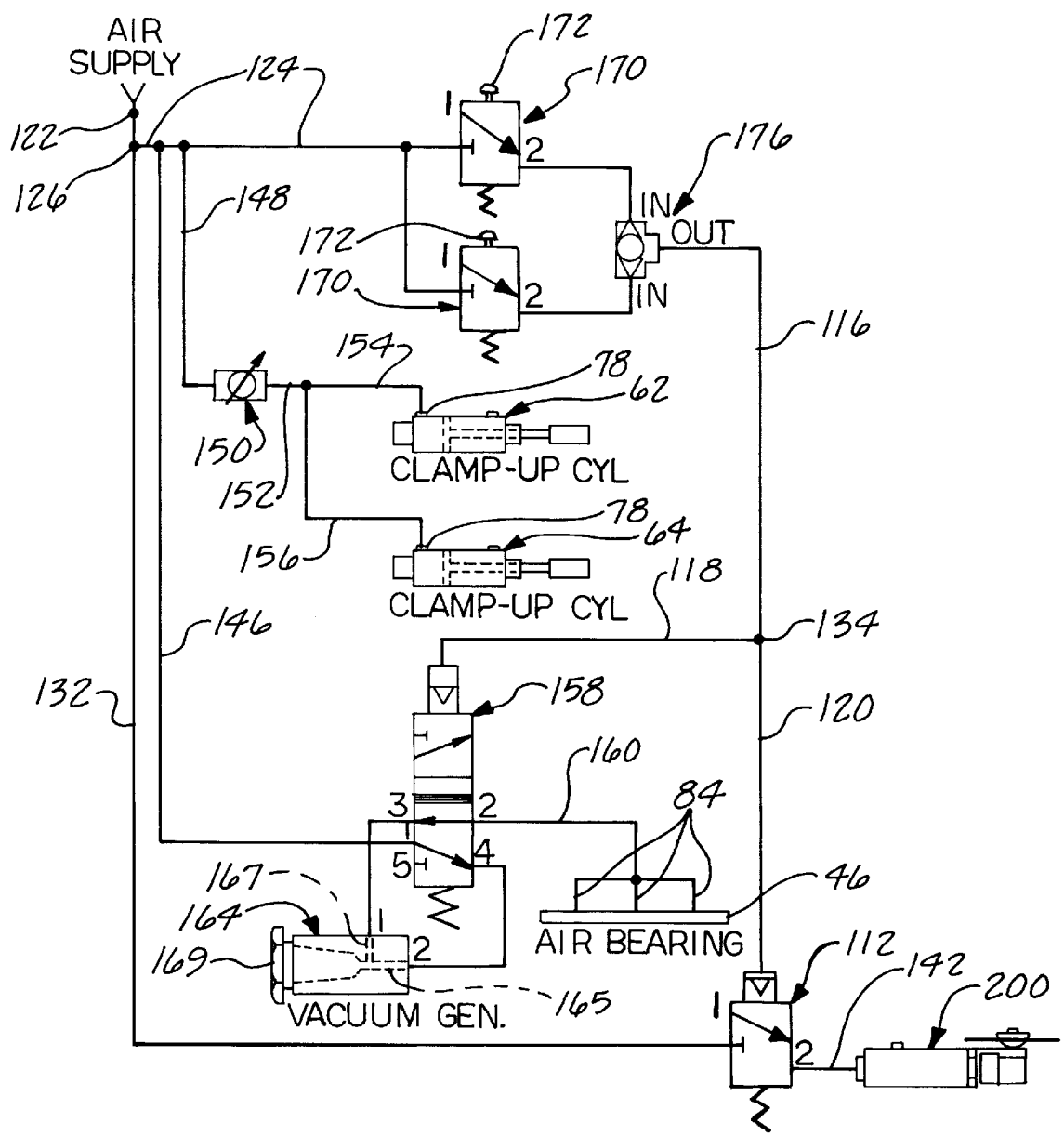
FIG. 17 is an air logic diagram of a cutting tool in accordance with the present invention.

The discussion of the multiple air regulating components and the various air passages is presented below in reference to the air logic diagram of FIG. 17. Structural views of some components, where available, are noted. Referring to FIG. 17, the air regulating components include two 3-way handle valves 170; a shuttle valve 176; a pressure regulator 150; a 4-way switching valve 158; a vacuum generator 164; and a 3-way air valve 112. These components are pneumatically connected via various air passages. Each of these components and air passages are formed from structures known in the art and may be selected from currently available commercial stock as appropriate.

An external supply of pressurized air is provided to the cutting tool 26. For one embodiment, it has been found that 90 psig of pressure is a sufficient amount of force. The high pressure air enters the cutting tool 26 via an air pressure supply port 122 (also shown in FIGS. 9, 11, 12). The air pressure supply port 122 may be formed of any known pneumatic fixture that is capable of attaching to an air pressure supply source. The fixture of the port 122 extends horizontally through one of the openings 99 of the back plate 100. Optimally, the fixture of the port 122 is firmly secured to the back plate 100 to prohibit the air pressure supply line from jarring the air regulating components within the housing 98 during operations.

The air pressure supply port 122 is pneumatically connected to a tube fitting tee 126 (FIGS. 9, 11) which allows the air supply to split into a component air supply path 124 (FIGS. 11, 14) and a 3-way valve input pressure path 132 (FIGS. 9–11, 13). The tube fitting tee 126 is located within the housing 98. The component air supply path 124 branches into two lines, one line each passing out of a side plate first opening 101 into the hollow interior of a handle 168 to join a 3-way handle valve 170 (FIG. 14) attached to the interior of the hollow handle 168. The valves 170 are shown in FIG. 17 in their normally closed position. The valves 170 are in communication with and activated by the handle push buttons 172 (FIG. 14). Depressing the buttons 172 allows pressurized air to flow through the valves 170 into the shuttle valve 176. The shuttle valve 176 is located within the housing 98.

Figure 10:
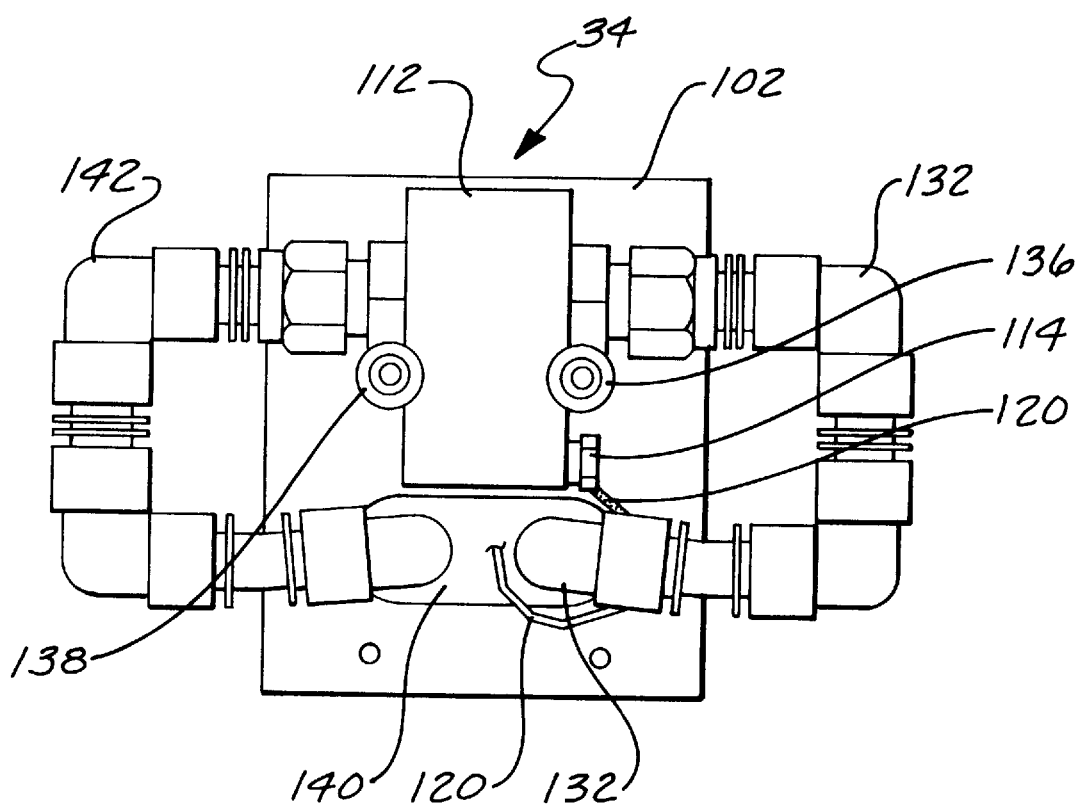
FIG. 10 is a front view of portions of the air supply assembly of FIG. 9.
Figure 11:
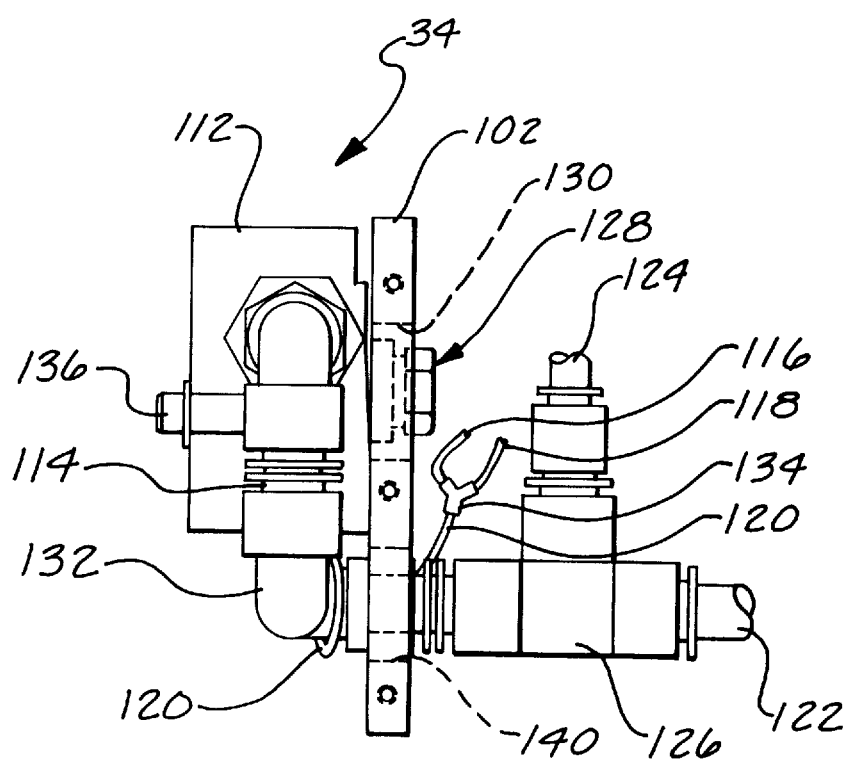
FIG. 11 is a side view of portions of the air supply assembly of FIG. 9.

Still referring to FIG. 17, the pressurized output air of the shuttle valve 176 flows into a shuttle valve output pressure path 116 (FIG. 11) that eventually branches at joint 134 (FIG. 11) into pressure path A (labeled item 118) and pressure path B (labeled item 120). Pressure path B 120 (FIGS. 9–11) pneumatically inputs to the 3-way air valve 112 (FIGS. 4, 9–11, and 13) at a handle switch input pressure port 114 (FIG. 10, 11). The 3-way air valve 112 is normally closed. When pressurized air is supplied to the valve 112 from both the 3-way valve input pressure path 132 and the pressure path B 120, the 3-way air valve 112 outputs air pressure to the pneumatic work tool 200 (FIGS. 2–4, 13–14) via an air valve output path 142 (FIGS. 3, 4, 9, 12, 13). The air valve pressure path 142 exits the housing 98 via an opening 99 in the back plate 100.

Referring still to FIG. 17, the component air supply path 124 has two branches extending from it: a clamp mechanism input path 148 and a 4-way valve input path 146. The clamp mechanism path 148 inputs to the pressure regulator 150 which limits the value of the air pressure it outputs to not more than a specific amount. For one embodiment, limiting the air pressure to 30 psig has yielded good results. It is important that the pressure be limited to only that which is required to keep the air cylinders 62, 64 tightly gripping the T-shaped track 30, but not so much as to make it difficult for the mechanic to translate the cutting tool 26 along the track 30 during operations.

The pressure regulator 150 outputs air via a regulator output pressure line 152 (FIGS. 2, 3, 12). This line 152 splits into two parts 154, 156 (FIGS. 2, 3, 5), one each entering the air cylinders 62, 64, respectively, via the air cylinder air pressure ports 78 (FIG. 5).

The 4-way valve input path 146 connects to the 4-way valve 158. In the preferred embodiment, the 4-way valve 158 has the vacuum generator 164 integrally formed therewith. The vacuum generator 164 is of a type generally known to those skilled in the art. It includes a main channel 165, a small cross-sectioned sub-channel 167, and an exit port 169. Pressure path A 118 stemming from the shuttle valve output pressure path 116, also connects to the 4-way valve 158. The output of the valve 158 is carried through an air bearing input path 160 which itself may branch into various sub-lines 84 (FIGS. 2–5, 13) in order to distribute the supply of air pressure to different locations in the air bearing pocket 50.

The 4-way valve 158 has two operative positions. The first position (shown in FIG. 17) causes the pressurized air received from the 4-way valve input path 146 to enter into, and immediately expel from, the vacuum generator 164 via its main channel 165. The housing 98 is not sealed. Therefore expelled air easily exits between the housing plates and through the front and back plate holes. Within the generator 164, the fast flowing, high pressure air in the main channel 165 creates a vacuum in the sub-channel 167 that acts to suck air from the air bearing input path 160. Alternatively stated, the first operative position of the 4-way valve 158 causes negative air pressure through the air bearing input path 160 and ultimately within the air bearing pocket 50. This negative pressure provides the appropriate suction between the air bearing and the track upper surface to hold the cutting tool 26 at any particular location along the track 30 regardless of the weight or orientation of the cutting tool 26.

The second position avoids the vacuum generator 164, allowing the pressurized air received from the 4-way valve input path 146 to enter directly into the air bearing input path 160. This positive pressure enters the air bearing pocket 50 and expels out the plurality of small holes 48 therein. Given sufficient air pressure, the air bearing will be pushed away from the track 30, though still connected to the track 30 via the guide rollers 86, 96. The compression springs 88 simply compress to allow the guide rollers 86, 96 to be extended vertically a slight distance.

As will be readily appreciated by those skilled in the art, there are two basic states of the air supply assembly 34. In the first state, regulated air pressure is supplied to the air cylinders 62, 64 to cause them to continuously urge the cam rollers 52, 54 towards the cam yoke rollers 56, 58. Air pressure is supplied to one input port of the 3-way air valve 112, however, because the valve 112 is yet only partially activated, it will not supply air pressure to the work tool 200. Air pressure is supplied to both the 3-way handle valves 170, which remain closed due to the handle buttons 172 not yet being depressed. Air pressure is also supplied to the 4-way valve 158 and vacuum generator 164 to cause the air bearing to attach to the track 30 via the strong suction force created by the vacuum generator.

The second state is entered by depressing the handle buttons 172. While depressed, air pressure is shuttled to the 4-way valve 158 to force it to close off the vacuum generator 164 and supply positive air pressure to the air bearing 46. The air bearing 46 then forces the cutting tool 26 to "float" above the track 30. At the same time air pressure is also shuttled to the 3-way air valve 112, allowing it to provide air pressure to the work tool 200. Air pressure is supplied to the air cylinders 62, 64 in the same manner as before. The second state permits the mechanic to glide the cutting tool 26 along the track 30, easily cutting the work piece to a predetermined shape.

As will also be understood by those skilled in the art, the air supply system should be pneumatically balanced in order that sufficient air pressure is available to components when needed. In particular, it is very important that air flow be efficiently balanced between the work tool and the air bearing. It has been found that 50 to 60 psig of air pressure need be maintained on the air bearing of the above described embodiment for optimum floating performance.

The cutting assembly includes an arrangement for releasably attaching the work tool 200. One of a number of arrangements may be used, the only requirement being the ability to secure the work tool 200 to one of the base assembly 32 or the air supply assembly 34 and the ability to hold the work tool 200 steady during use. The cutting assembly arrangement of FIGS. 3, 4, 13, and 14 includes a support bracket 210 for holding the work tool 200; first and second side rails 216, 218 for wedging the support bracket 210 therebetween; and three wedge lock knobs 214 for urging the side rails toward each other in order to clamp the support bracket 210 in place.

The work tool preferably has an on/off switch 202 for controlling its activated state and an exhaust deflector 212 for dissipating excess pressurized air. The work tool 200 may actually be one of a number of known devices. An abrasive cutoff grinder wheel tool (i.e., and abrasive cutting blade) is drawn in the FIGURES herein. The work tool 200 should also include a particle guard 206 to keep debris from projecting toward the mechanic, and a nozzle 208 for connecting to a shop vacuum in order to evacuate debris. FIGS. 3, 14–16 show a circular particle guard 206 and tubular nozzle 208 for use with the abrasive cutting blade 204.

Referring to FIGS. 12 and 13, the support bracket 210 includes a flat base portion 213 having an upper surface 215 and a lower surface 217; and two rigid clamping straps 220, each including tightening bolts 211. The two rigid clamping straps 220 are permanently attached to the upper surface 215 of the flat base. The strap bolts 211 are preferably located in the upper regions of the straps 220 for easier access. The shape of the flat base lower surface 217 is rectangular, though smaller in size than the top plate 108 size. In operation, the flat base lower surface 217 is adjacent the upper surface of the top plate 108.

The first and second side rails 216, 218 are generally metal bars that are positioned along longitudinal sides of the flat base 213. The first side rail 216 is longitudinally mounted to the upper surface of the top plate 108 near one of the side plates, using conventional methods. The second side rail 218 is longitudinally placed on the upper surface of the top plate 108 near the other side plate. The three wedge lock knobs 214 include screws 219 extending therefrom. The screws 219 are threaded into holes that extend through the second side rail 218 and into the top plate 108 at an inward angle.

Referring to FIG. 12, the preferred shape of the interface between the side rails 216, 218 and the flat base 213 is contoured. In FIG. 12 a pointed longitudinal ridge 224 extends from each flat base side edge. The mating surface of each side rail is shaped to receive the ridge within a longitudinal slot 226. A number of different interface shapes are available, as are other methods of securing the support bracket between the side rails, e.g., a dove tail arrangement, a dowel pin arrangement, a bearings arrangement, etc.

In operation, the work tool 200 is appropriately positioned within the rigid clamping straps 220 and the strap bolts 211 are tightening to secure the work tool 200 therein. The support bracket flat base 213 is slid between the first and second side rails 216, 218 and is positioned to extended the desired amount relative to the cutting tool. The wedge lock knobs 213 are screwed down. This causes the second side rail 218 is to move horizontally across the upper surface of the top plate 108, toward the first side rail 216. Because the support bracket flat base 213 is positioned between the first and second side rails, it becomes tightly held therebetween, thus securing the work tool 200 in the X direction (see FIG. 4).

Other arrangements of brackets and adjusting mechanisms may be used according to the particular application. What is important to the present invention is that some means be provided to attach the work tool to the cutting tool 26—the optimal means being both adjustable and entirely releaseable. This gives the operator greater flexibility in positioning the cutting tool exactly where needed, in replacing worn work tools, and in using different work tools for different tasks.

The overall aircraft trimming device operating procedure includes the steps of first securing the pneumatic work tool 200 to the cutting tool 26. The cutting tool 26 is slid onto the T-shaped track 30. The air pressure supply source is connected to the air pressure supply port 122. The entering air pressure causes the air cylinders 62, 64 to clamp onto the track 30 and the air bearing to suction attach to the upper surface 33 of the track. The handle buttons 172 are depressed to cause the cutting tool 26 to float on the track, at which time the mechanic translates the cutting tool 26 to its start location along the track 30. The handle buttons 172 are released and once again the air bearing brakes the cutting tool 26 to the track 30. In this manner, the handle buttons provide a dead-man switch. When the mechanic lets go of the cutting tool for any reason, the work tool will stop and the air bearing suction brake will be applied.

Next, the shop vacuum is attached to the nozzle 208. The aircraft trimming device 20 is positioned next to the workpiece and any slight adjustments to the work tool 200 orientation are made (e.g., depth of cut, angle of cut, etc.) The on/off switch 202 of the work tool 200 is moved to its on position. The trimming device 20 is ready to trim the work piece. This is accomplished by the mechanic grabbing the handles to simultaneously depress the handle buttons 172 while translating the cutting tool 26 along the track 30. Depression of the handle buttons activates the grinder and the air bearing floating capability. Because the cutting tool 26 floats above the track upper surface 33, very little force from the mechanic is actually required to guide the tool. (As with any tool, use of protective wear, especially eye goggles, is strongly advised.)

Should the work piece include multiple layers of dissimilar material, the trimming device 20 may be made to cut the first layer using one blade, then subsequently cut the next layer using a different blade. The mechanic need only turn off the work tool and attach the appropriate blade.

While the preferred embodiment of the invention has been illustrated and described, it will be appreciated that various changes can be made therein without departing from the spirit and scope of the invention. For example, the present invention may be of various sizes and materials, depending on the intended application. It may utilize various work tools to perform tasks others than cutting, and be applied to components other than aircraft wings. It is to be understood that the present invention encompasses variations in these items as would be readily understood by those skilled in the art.

The embodiments of the invention in which an exclusive property or privilege is claimed are defined as follows:

1. A pneumatic aircraft trimming device for use in trimming in aircraft component, the trimming device comprising:
   (a) a guide assembly including a track having a smooth surface and opposed side surfaces; and
   (b) a trimming assembly capable of translating along the guide assembly, the trimming assembly comprising:
      (i) a base assembly movably engaged with the track; the base assembly comprising a base plate, an air bearing connected to the base plate and having a lower surface in juxtaposition to the smooth surface of the track, and clamping components including at least one air cylinder connected to the base plate; the clamping components further including at least two rollers connected to the base plate, one roller rolling along one of said track side surfaces, another roller rolling along the opposed track side surface, the at least one air cylinder being interconnected to at least one of the two rollers, whereby extension and retraction of the cylinder alters the amount of clamping force applied to the track side surfaces by the rollers;
      (ii) an air supply assembly including a first pneumatic input path connected to the air bearing, and a second pneumatic input path connected to the at least one air cylinder of the clamping components; and
      (iii) a work tool for trimming the aircraft component, the work tool being connected to one of the base assembly and the air supply assembly;
   (c) wherein the air bearing expels pressurized air at the track smooth surface to aid in translation of the base assembly along the track while the work tool simultaneously trims the aircraft component and the clamping components clamp the track.

2. The aircraft trimming device according to claim 1 wherein the work tool is a pneumatically powered work tool that includes a pneumatic input port, the air supply assembly being connected to the work tool input port to direct pressurized air to the work tool during use.

3. The aircraft trimming device according to claim 1, wherein the clamping components further include at least one arm having a first end, a second end, and a pivot location therebetween; the arm being rotatably connected to the base plate at the pivot location; one roller being connected to the base plate at a fixed position and another roller being connected to the arm first end; the at least one air cylinder being interconnected between the base plate and the arm second end; wherein extension and retraction of the air cylinder causes the arm to rotate about its pivot location and its connected roller to move farther and closer to the track side.

4. A handtool device for use in altering an aircraft component under the guidance of an operator, the handtool device comprising:
   (a) a guide assembly including a track having a smooth surface; and (b) a cutting assembly comprising:
  (i) a base assembly movably engaged with the track and including an air bearing having a lower surface in juxtaposition to the track smooth surface, the air bearing including at least one air outlet hole; and
  (ii) an air supply assembly comprising:
    a switching valve having a pneumatic input path in communication with an air supply source and a pneumatic output path connected to the air bearing, the switching valve having a first position in which negatively pressurized air is passed to the air bearing and a second position in which positively pressurized air is passed to the air bearing;
    a handle valve connected to the base assembly and having a pneumatic input path in communication with the air supply source and a pneumatic output path in communication with the switching valve, the handle valve having a first handle valve position which causes the switching valve to assume its first position and a second handle valve position which causes the switching valve to assume its second position; and
    a push button positioned on the exterior of the device and connected to the handle valve, the push button including two positions, a first position causing the handle valve and thus the switching valve to assume their first positions, a second position causing the handle valve and thus the switching valve to assume their second positions; and
  (iii) a work tool connected to one of the base assembly and the air supply assembly, wherein the pneumatic output path of the handle valve is also in communication with a means for actuating the work tool.

5. The handtool device according to claim 4, wherein the work tool is a pneumatically powered work tool that includes a pneumatic input port, the air supply assembly being connected to the work tool port to direct pressurized air to the work tool.

6. The handtool device according to claim 4, further including a bracket connected to the cutting assembly, the work tool being releasably and adjustably held by the bracket.

7. The handtool device according to claim 4, wherein the air supply source continuously directs positively pressurized air to the air supply assembly, and the air supply assembly further includes a vacuum generator pneumatically connected to the switching valve, the vacuum generator for changing positively pressurized air into negatively pressurized air.

8. The handtool device according to claim 4, wherein the cutting assembly further includes a handle connected to one of the base assembly and the air supply assembly the push button being located on the handle.

9. The handtool device according to claim 4, wherein the means for actuating the work tool includes a three-way air valve having a first pneumatic input path connected to the air supply source, a second pneumatic input path connected to the output of the handle valve, and a pneumatic output path connected to the work tool; and wherein in the second handle valve position, the three-way valve allows positively pressurized air to pass from the air supply source to the work tool.

10. The handtool device according to claim 9, wherein the cutting assembly further includes a handle connected to one of the base assembly and the supply assembly, the push button being located on the handle.

* * * * *

UNITED STATES PATENT AND TRADEMARK OFFICE
CERTIFICATE OF CORRECTION

PATENT NO. : 5,848,930
DATED : December 15, 1998
INVENTOR(S) : D.D. Jones

It is certified that error appears in the above-indentified patent and that said Letters Patent is hereby corrected as shown below:

| COLUMN | LINE | |
|---|---|---|
| 14 (Claim 2, | 46 line 1) | After "to claim 1" insert --,-- |
| 16 (Claim 5, | 2 line 4) | "tool port" should read --tool input port-- |
| 16 (Claim 8, | 18 line 3) | After "supply assembly" insert --,-- |
| 16 (Claim 10, | 32 line 3) | Before "supply" insert --air-- |

Signed and Sealed this

Twenty-fifth Day of May, 1999

Attest:

Q. TODD DICKINSON

*Attesting Officer*      *Acting Commissioner of Patents and Trademarks*